(12) United States Patent
Cho et al.

(10) Patent No.: US 11,505,023 B2
(45) Date of Patent: Nov. 22, 2022

(54) METHOD AND APPARATUS FOR CONTROLLING ELECTRONIC CONTROL SUSPENSION

(71) Applicants: HYUNDAI MOTOR COMPANY, Seoul (KR); KIA MOTORS CORPORATION, Seoul (KR)

(72) Inventors: Deok Hyun Cho, Sejong-si (KR); Beom Kyu Park, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 234 days.

(21) Appl. No.: 16/909,357

(22) Filed: Jun. 23, 2020

(65) Prior Publication Data

US 2021/0178845 A1    Jun. 17, 2021

(30) Foreign Application Priority Data

Dec. 13, 2019  (KR) .......................... 10-2019-0167083

(51) Int. Cl.
*B60W 30/09*   (2012.01)
*B60G 17/00*   (2006.01)
(Continued)

(52) U.S. Cl.
CPC ............. *B60G 17/00* (2013.01); *B60W 30/09* (2013.01); *B60W 30/0956* (2013.01);
(Continued)

(58) Field of Classification Search
CPC ................ B60G 17/00; B60G 2400/10; B60G 2400/204; B60G 2400/33; B60G 2401/14;
(Continued)

(56) References Cited

U.S. PATENT DOCUMENTS

2014/0195112 A1*  7/2014  Lu ........................ B60G 17/016
                                                     703/2
2014/0297116 A1* 10/2014  Anderson ............ H02K 7/1823
                                                     701/37
(Continued)

FOREIGN PATENT DOCUMENTS

KR         10-1332257 B1    11/2013
KR      2020-0074701 A       6/2020
KR      2021-0006558 A       1/2021

*Primary Examiner* — Jason Holloway
(74) *Attorney, Agent, or Firm* — McDonnell Boehnen Hulbert & Berghoff LLP

(57) ABSTRACT

The present disclosure relates to a method and an apparatus for controlling an electronic control suspension using a deep learning-based road surface classification model. The method for controlling an electronic control suspension in a vehicle including a camera and a GPS receiver may include collecting location information of the vehicle using the GPS receiver while driving, identifying whether there is a previously generated road surface classification model corresponding to a front obstacle when the front obstacle is detected, determining a first control value based on a first characteristic value corresponding to the road surface classification model when there is the road surface classification model as a result of the identification, controlling the electronic control suspension with the determined first control value when entering the obstacle, and collecting new sensing data through a physical sensor, and correcting the first characteristic value based on the new sensing data.

16 Claims, 8 Drawing Sheets

(51) Int. Cl.
  *B60W 30/095* (2012.01)
  *B60W 40/06* (2012.01)
  *G06N 3/04* (2006.01)
  *G06N 3/08* (2006.01)
  *G01S 19/42* (2010.01)

(52) U.S. Cl.
  CPC ............. *B60W 40/06* (2013.01); *G01S 19/42* (2013.01); *G06N 3/04* (2013.01); *G06N 3/08* (2013.01); *B60G 2400/10* (2013.01); *B60G 2400/204* (2013.01); *B60G 2400/33* (2013.01); *B60G 2401/14* (2013.01); *B60W 2420/42* (2013.01); *B60W 2420/52* (2013.01); *B60W 2510/0604* (2013.01); *B60W 2520/105* (2013.01); *B60W 2520/28* (2013.01)

(58) Field of Classification Search
  CPC .......... B60G 2400/823; B60G 2500/10; B60G 2500/30; B60G 17/0165; B60G 17/01908; B60G 17/01933; B60W 30/09; B60W 30/0956; B60W 40/06; B60W 2420/42; B60W 2420/52; B60W 2510/0604; B60W 2520/105; B60W 2520/28; B60W 10/22; B60W 50/14; G01S 19/42; G01S 17/89; G01S 17/931; G06N 3/04; G06N 3/08; G06N 3/0454; B60R 21/0134
  See application file for complete search history.

(56) References Cited

U.S. PATENT DOCUMENTS

| | | | |
|---|---|---|---|
| 2016/0318365 A1* | 11/2016 | Sivaraman | G01S 17/88 |
| 2017/0010121 A1* | 1/2017 | Shashua | G01C 21/14 |
| 2017/0137023 A1* | 5/2017 | Anderson | B60W 10/20 |
| 2017/0285646 A1* | 10/2017 | Connor | G05D 1/0214 |
| 2018/0056745 A1* | 3/2018 | Saylor | G01C 21/3664 |
| 2021/0012131 A1 | 1/2021 | Kim et al. | |

* cited by examiner

| GPS | CAMERA | | | | | PHYSICAL SENSOR | | | | |
|---|---|---|---|---|---|---|---|---|---|---|
| | | OBSTACLE CHARACTERISTICS | | | | TAMPING CHARACTERISTIC | | INERTIAL MASS CHARACTERISTIC | | |
| LOCATION INFORMATION (LATITUDE, LONGITUDE) | TYPE OF ROAD SURFACE | OBSTACLE TYPE | HEIGHT / DEPTH (cm) | WIDTH (cm) | INCIDENT ANGLE (°) | d | PISTON SPEED (m/s) | b | VERTICAL ACCELERATION (m/s²) | m | RIDING COMFORT (1~10) |
| [32.232640, 127.650225] | NORMAL ROAD SURFACE | SPEED BUMP | 15.494 | 73.734 | 22.718 | 16.23 | 2.556 | 2.45 | 3.255 | 1.25 | 8 |
| [32.348125, 128.515612] | NORMAL ROAD SURFACE | SPEED BUMP | 20.132 | 64.352 | 32.034 | 22.73 | 4.726 | 3.22 | 5.250 | 2.62 | 7 |
| [32.546825, 128.554122] | NORMAL ROAD SURFACE | MANHOLE | 6.323 | 85.371 | 90 | 13.47 | 5.883 | 4.21 | 6.392 | 2.54 | 7 |
| [32.453455, 128.565130] | NORMAL ROAD SURFACE | SPEED BUMP | 25.424 | 140.136 | 19.979 | 14.06 | 2.343 | 1.74 | 4.075 | 1.02 | 8 |
| [33.345345, 128.845131] | NORMAL ROAD SURFACE | POTHOLE | -10.845 | 35.224 | -90 | 32.55 | 6.934 | 5.23 | 7.472 | 2.94 | 5 |
| [33.348344, 129.894413] | NORMAL ROAD SURFACE | SPEED BUMP | 36.457 | 245.113 | 16.576 | 13.47 | 1.463 | 1.37 | 13.57 | 0.89 | 9 |
| [32.548321, 127.641452] | BELGIAN | . | . | . | . | . | 4.322 | 3.42 | 5.783 | 2.78 | 6 |
| [31.145625, 128.545133] | NORMAL ROAD SURFACE | POTHOLE | -6.204 | 54.234 | -90 | 13.58 | 5.637 | 4.38 | 6.837 | 3.52 | 4 |
| [31.345613, 128.878922] | COBBLED ROAD | . | . | . | . | . | 4.075 | 3.66 | 4.722 | 2.36 | 6 |
| ... | | | | | | | | | | | |

* RIDING COMFORT IS EXCELLENT AS IT IS CLOSER TO 10

Fig. 5

METHOD AND APPARATUS FOR CONTROLLING ELECTRONIC CONTROL SUSPENSION

CROSS REFERENCE TO RELATED APPLICATIONS

This application claims the benefit of priority to Korean Patent Application No. 10-2019-0167083, filed in the Korean Intellectual Property Office on Dec. 13, 2019, the entire contents of which are incorporated herein by reference.

TECHNICAL FIELD

The present disclosure relates to control for an electronic control suspension, and more specifically, to a technology for managing a road surface classification model through deep learning based on actually-measured data, and controlling an electronic control suspension based on a characteristic value corresponding to a corresponding road surface classification model when detecting an obstacle to improve a riding comfort.

BACKGROUND

Recently, many automobile companies have actively researched an active suspension control system to improve a vehicle's riding comfort and steering stability.

A conventional active suspension system has improved riding comfort by determining road surface inputs that are incoming to wheels provided in the vehicle and adjusting damping according thereto.

In addition, the conventional preview suspension system adopts a method of identifying only the type of an obstacle on a road surface ahead using a camera and adjusting damping, a method of obtaining road surface information at a corresponding position based on a Global Positioning System (GPS) and adjusting damping according to the obtained road surface information, and a method of identifying the type and position of an obstacle using a camera and a GPS and adjusting damping.

However, the above-described conventional suspension system has disadvantages, in that there is a difference with the shape of an actual road surface, and in particular, in the case of a GPS-based method, a person needs to continuously identify and update a road surface condition to reflect the road surface condition which varies frequently.

Accordingly, there is a need for a suspension system capable of more accurate damping control by reflecting an actual road surface condition in real time.

SUMMARY

The present disclosure has been made to solve the above-mentioned problems occurring in the prior art while advantages achieved by the prior art are maintained intact.

An aspect of the present disclosure provides a method and an apparatus for controlling an electronic control suspension using a deep learning-based road surface classification model.

Another aspect of the present disclosure provides a method and an apparatus for controlling an electronic control suspension which provides an optimal control value for the electronic control suspension by correcting a characteristic value and a control value in real time through deep learning based on actually-measured data of detected obstacles.

Still another aspect of the present disclosure provides a method and an apparatus for controlling an electronic control suspension which identify not only a type and a position of an obstacle, but also a detailed specification of the obstacle and correct a road surface classification model based on actually-measured data for the obstacle to provide optimal control for the electronic control suspension.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a method for controlling an electronic control suspension in a vehicle including a camera and a GPS receiver may include collecting location information of the vehicle using the GPS receiver while driving, identifying whether there is a previously generated road surface classification model corresponding to a front obstacle when the front obstacle is detected, determining a first control value based on a first characteristic value corresponding to the road surface classification model when there is the road surface classification model as a result of the identification, controlling the electronic control suspension with the determined first control value when entering the obstacle, and collecting new sensing data through a physical sensor, and correcting the first characteristic value based on the new sensing data.

According to an embodiment, the method may further include performing image processing using the camera when there is no previously generated road surface classification model corresponding to the detected obstacle as the result of the identification.

According to an embodiment, the image processing using the camera may include collecting image data from the camera, and identifying a type of the obstacle by applying a convolutional neural network algorithm to the image data.

According to an embodiment, the image processing using the camera may include collecting radar data from the camera, and calculating a distance from the vehicle to the detected obstacle using the radar data.

According to an embodiment, the method may further include outputting information on the identified type of the obstacle to a cluster of the vehicle.

According to an embodiment, the physical sensor may include at least one of a vehicle speed sensor, a wheel speed sensor, an acceleration/displacement sensor, and a throttle position sensor.

According to an embodiment, the first characteristic value may include an obstacle characteristic value, a damping characteristic value, and an inertial mass characteristic value.

According to an embodiment, the obstacle characteristic value may include height or depth information of the obstacle, width information of the obstacle, incident angle information that is an angle of entry to the obstacle, and obstacle specification information, the damping characteristic value may include piston speed information and damping ratio information, and the inertial mass characteristic value may include vertical acceleration information, inertial mass information, and riding comfort information.

According to an embodiment, the correcting of the characteristic value may include determining whether the new sensing data falls within a valid data range, generating a second characteristic value by calculating an average of the new sensing data in the valid data range, and correcting an error by comparing the second characteristic value with the first characteristic value.

According to an embodiment, the valid data range may be adjusted according to the error correction.

According to another aspect of the present disclosure, an apparatus for controlling an electronic control suspension in cooperation with a camera device, a GPS receiver, and a physical sensing device provided in a vehicle includes a location information collection module that collects location information of the vehicle from the GPS receiver while driving, a control module that identifies whether there is a previously generated road surface classification model corresponding to a front obstacle and controls a damping force of the electronic control suspension when the front obstacle is detected, a control value determination module that determines a first control value corresponding to the damping force based on a first characteristic value corresponding to the road surface classification model, a physical sensing module that collects new sensing data from the physical sensing device while passing through the detected obstacle when the damping force is set to the determined first control value, a characteristic value generation module that corrects the first characteristic value based on the new sensing data According to an embodiment, the apparatus for controlling an electronic control suspension may further include an image processing module that performs image processing in cooperation with the camera device according to a control signal of the control module when there is no previously generated road surface classification model corresponding to the detected obstacle as a result of the identification.

According to an embodiment, the image processing module may include a means that collects image data from the camera device and a means that identifies a type of the obstacle by applying a convolutional neural network algorithm to the image data.

According to an embodiment, the image processing module may include a means that corrects radar data from the camera device and a means that calculates a distance from the vehicle to the detected obstacle using the radar data.

According to an embodiment, the image processing module may further include a means that outputs information on the identified type of the obstacle to a cluster of the vehicle.

According to an embodiment, the physical sensing device may include at least one of a vehicle speed sensor, a wheel speed sensor, an acceleration/displacement sensor, and a throttle position sensor.

According to an embodiment, the first characteristic value may include an obstacle characteristic value, a damping characteristic value, and an inertial mass characteristic value.

According to an embodiment, the obstacle characteristic value may include height or depth information of the obstacle, width information of the obstacle, incident angle information that is an angle of entry to the obstacle, and obstacle specification information, the damping characteristic value may include piston speed information and damping ratio information, and the inertial mass characteristic value may include vertical acceleration information, inertial mass information, and riding comfort information.

According to an embodiment, the characteristic value generation module may include a means that determines whether the new sensing data falls within a valid data range, a means that generates a second characteristic value by calculating an average of the new sensing data in the valid data range, and a means that corrects an error by comparing the second characteristic value with the first characteristic value.

According to an embodiment, the valid data range may be adjusted according to error correction.

The technical problems to be solved by the present disclosure are not limited to the aforementioned problems, and any other technical problems not mentioned herein will be clearly understood from the following description by those skilled in the art to which the present disclosure pertains.

BRIEF DESCRIPTION OF THE FIGURES

The above and other objects, features and advantages of the present disclosure will be more apparent from the following detailed description taken in conjunction with the accompanying drawings:

FIG. 5 is a diagram for describing data included in a road surface classification model according to an embodiment of the present disclosure;

DETAILED DESCRIPTION

Figure 1:
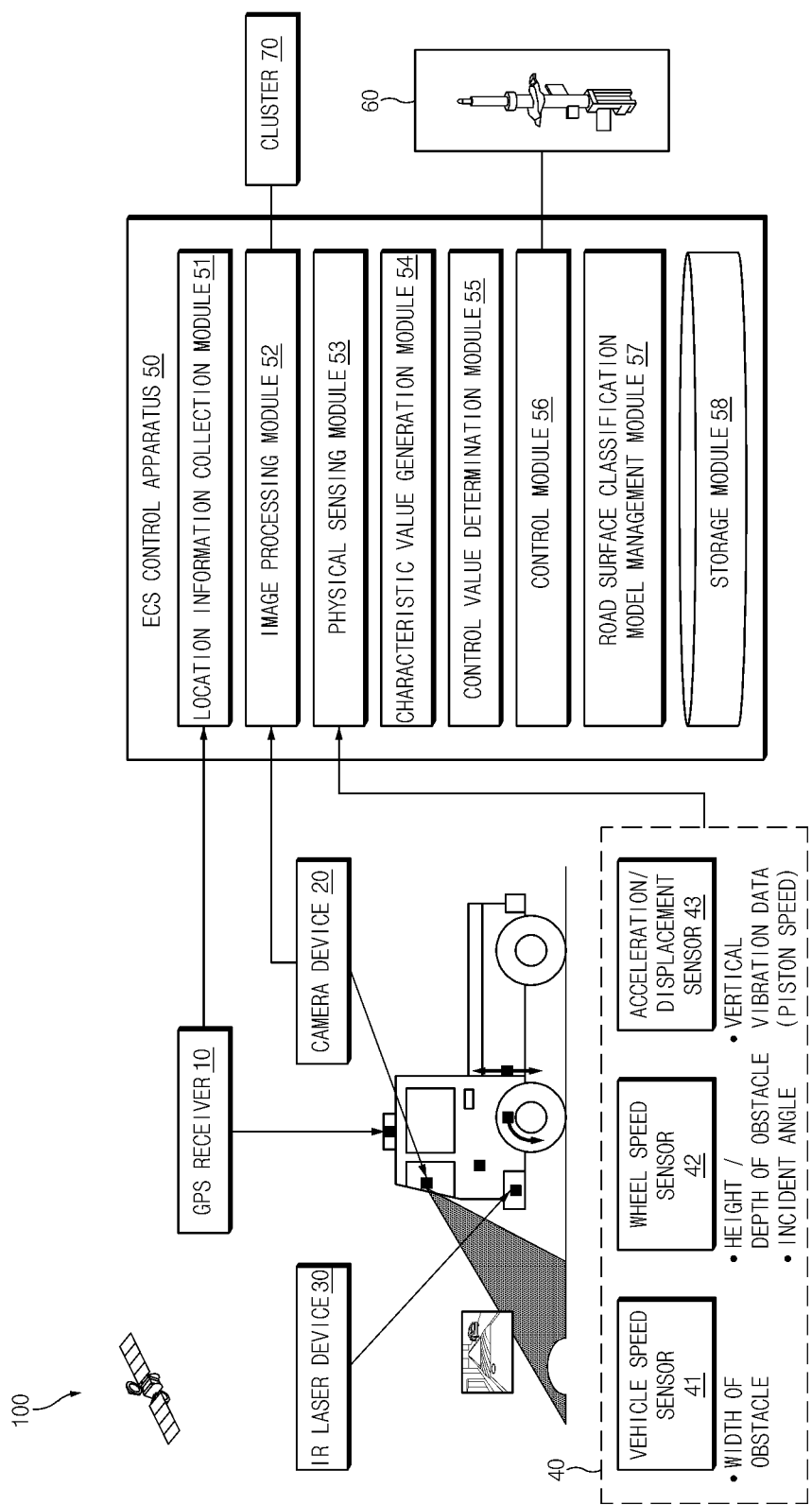
FIG. 1 is a diagram for describing the configuration of an ECS control system according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 8.

FIG. 1 is a diagram for describing the configuration of an ECS control system according to an embodiment of the present disclosure;

Referring to FIG. 1, an ECS control system 100 may include a GPS receiver 10, a camera device 20, an infrared (IR) laser device 30, a physical sensing device 40, an ECS control apparatus 50, an electronic control suspension (ECS) 60, and a cluster 70.

The physical sensing device 40 may include a vehicle speed sensor 41 that generates sensing data (vehicle speed) necessary to calculate a width of an obstacle, a wheel speed sensor 42 that generates sensing data (wheel speed) necessary to calculate a height/depth of an obstacle, and an incident angle of the vehicle to the obstacle, an acceleration/displacement sensor 43 that generates sensing data related to a piston movement speed of the suspension necessary for measuring the height change—that is, the vertical vibration data, and a throttle position sensor (TPS) (not shown) to generate sensing data related to a throttle position of a damper.

The TPS may be mounted on a throttle body and may perform a function of detecting an opening degree of a throttle valve. To this end, the TPS may include a structure in which a slider arm fixed to the throttle valve shaft is slidable in a state of being in contact with a resistance rail.

The ECS control apparatus 50 may include at least one of a location information collection module 51, an image processing module 52, a physical sensing module 53, a characteristic value generation module 54, a control value determination module 55, a control module 56, a road surface classification model management module 57 and a storage module 58.

The GPS receiver 10 may decode a GPS signal to generate location information, and provide the generated location information to the location information collection module 51. Here, the location information may include latitude information and longitude information.

The camera device 20 may be implemented using any one of an infrared camera, a stereo camera, or a mono camera, and may be any camera as long as the camera is able to photograph a front road surface while driving to generate image data and laser data and recognize a laser light position of a predetermined wavelength.

In general, a technology for recognizing only a specific range of wavelengths other than sunlight is required because sunlight emits light in all ranges of wavelengths. For example, the TOF (Time of Flight) camera technology may be adopted to recognize only a specific range of wavelengths.

A TOF camera is a camera that detects a subject by using, for example, a delay in a phase caused when light modulated at a predetermined frequency is reflected and returned from the subject.

With respect to the operation principle of the TOF camera, the TOF camera may include a light source that emits light having a predetermined center wavelength, and may modulate the light emitted from the light source with a predetermined frequency and radiate the modulated light onto a subject to be detected. Thereafter, the light irradiated onto the subject may be reflected and returned to the TOF camera, and the TOF camera may detect the returned light using a built-in sensor. In this case, when phases of light radiated from the TOF camera and light reflected from the subject and returned are compared with each other, a distance from the vehicle to the subject may be calculated.

The accuracy of the TOF camera is affected by the modulation frequency, dynamic range, or sensitivity of the light radiated from the TOF camera, and as a result, it is necessary to modulate light with a frequency suitable for the distance and radiate the light onto a subject to secure accuracy above a desired level.

The IR laser device 30 may include a plurality of laser points emitting a single light source of a line beam type. For example, the wavelengths of the laser light emitted by the IR laser device 30 may be in a range of 900 nm to 1600 nm.

According to an embodiment of the present disclosure, the laser light may be formed not to be visible to a driver's eyes, and to be recognized only through the camera device 20 because the laser light is emitted using a high-frequency infrared laser point provided in a vehicle, removing fear that the driver's visibility is disturbed or weakened.

The electronic control suspension (ECS) 60 may be an electronic control system that controls a posture of the vehicle body by changing a damping force of a shock absorber according to a driving speed and road conditions to improve riding comfort and driving stability at the same time.

The ECS 60 may employ a method for adjusting a damping force of the shock absorber in a stepwise manner using a motor, a hydraulic device and the like and may be currently applied only to expensive vehicles due to energy consumption, structural complexity, and economics.

For example, the ECS 60 may increase a ride height on an unpaved road to soften suspension characteristics to improve vehicle body protection and a riding comfort, and decrease the ride height on a highway to reduce air resistance and strengthen suspension characteristics to improve the driving stability.

The ECS 60 may control the riding comfort of the vehicle by using a body vertical acceleration sensor that detects a vertical acceleration of the vehicle body and a wheel vertical acceleration sensor that detects a vertical acceleration of wheels, and control the handling of the vehicle by using the damping force of the ECS 60 as much as possible in turning of the vehicle.

Hereinafter, the operation of the ECS control apparatus 50 will be described in detail.

The location information collection module 51 may collect current location information of a vehicle while driving.

The image processing module 52 may process front shot image data received from the camera device 20 to identify a road surface condition and an obstacle type.

The road surface condition and the obstacle type identified by the image processing module 52 may be output through the cluster 70.

When laser light or infrared slit light emitted from the IR laser device 30 is reflected on an obstacle or a road surface, the camera device 20 according to an embodiment may perform a function of absorbing and converting the light into laser data calculated in a coordinate format.

To this end, the camera device 20 may be provided with a band pass filter lens (not shown) that absorbs only light having a wavelength equal to that of the laser light emitted by the IR laser device 30.

The image processing module 52 may identify the road surface condition, the obstacle type, and a distance from a current vehicle position to the detected obstacle based on the image data and laser data collected from the camera device 20.

The physical sensing module 53 may collect a variety of sensing data from the physical sensing device 40 and determine whether the collected sensing data falls within a valid range.

The characteristic value generation module 54 may generate characteristic values of the detected obstacle using sensing data which falls within the valid range.

Here, the characteristic values may include an obstacle characteristic value, a damping characteristic value, and an inertial mass characteristic value.

The obstacle characteristic value may include a height and a depth of the obstacle, a width of the obstacle, an incident angle (θ) of a vehicle wheel when entering the obstacle, and obstacle specification (d).

The damping characteristic value may include a piston speed and a damping ratio (b).

The inertial mass characteristic value may include a vertical acceleration, an inertial mass (m), and riding comfort.

The road surface classification model according to an embodiment may include location coordinate information, road surface type information, obstacle type information, an obstacle characteristic value, a damping characteristic value, and an inertial mass characteristic value, The control value determination module 55 may determine an ECS control value corresponding to a corresponding characteristic value.

The control module 56 may control the ECS 60 according to the determined control value.

The road surface classification model management module 57 may generate a new road surface classification model or correct a previously generated road surface classification model based on a variety of sensing data measured when passing through the obstacle.

The storage module 58 may store the road surface classification model generated by the road surface classification model management module 57

The control module 56 according to an embodiment may identify whether there is a road surface classification model corresponding to a detected obstacle by referring to the storage module 58 when a front obstacle is detected while driving.

As a result of the identification, when there is a road surface classification model corresponding to the detected obstacle, the control module 56 may extract a characteristic value corresponding to the corresponding road surface classification model, and request and obtain an ECS control value corresponding to the extracted characteristic value from the control value determination module 55.

The control module 56 may control the ECS 60 using a control value obtained when entering an obstacle, and allow the physical sensing module 53 to collect new sensing data while passing through the obstacle.

The characteristic value generation module 54 may correct the characteristic value based on the newly collected sensing data, and update the corresponding road surface classification model of the storage module 58 using the corrected characteristic value.

When the road surface classification model corresponding to the detected obstacle does not exist in the storage module 58, the control module 56 may identify a type of an obstacle detected by collecting image data and laser data from the camera device 20, and calculate a distance to the obstacle.

Figure 2:
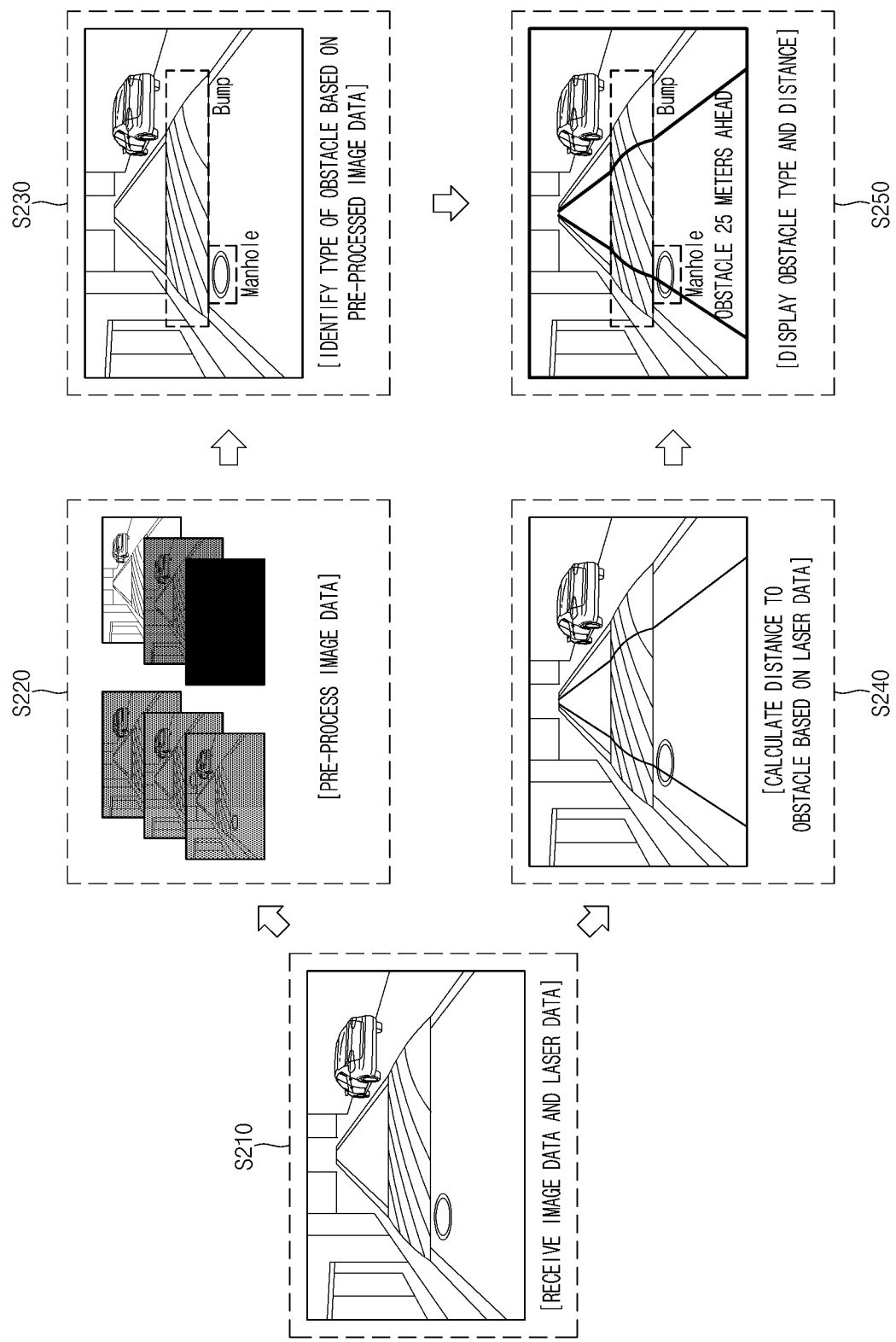
FIG. 2 is a diagram for describing a method for identifying a type of an obstacle and a distance in an ECS control apparatus according to an embodiment of the present disclosure.

FIG. 2 is a diagram for describing a method for identifying a type of an obstacle and a distance in an ECS control apparatus according to an embodiment of the present disclosure.

Referring to FIG. 2, the image processing module 52 of the ECS control apparatus 50 may receive image data and laser data from the camera device 20 as shown in S210.

The image processing module 52 may pre-process the received image data as shown in S220, and identify a type of obstacle based on the pre-processed image data as shown in S230. For example, the image processing module 52 may identify the type of the obstacle by processing the image data through a convolutional neural network (CNN) algorithm Here, the CNN algorithm may be an image processing method for more effectively processing an image by applying a filtering technique to an artificial neural network, and have an advantage of automatically identifying an object included in an image by automatically learning a filter that maximizes accuracy of image classification.

The type of an obstacle identified by the image processing module 52 may be output through the cluster 70, enabling the driver to recognize the type of obstacle located in the front.

The image processing module 52 may calculate the distance to the obstacle based on the laser data received from the camera device 20 as shown in S240.

The image processing module 52 may generate a final image in which the identified type of the obstacle and the calculated distance to the obstacle are displayed as shown in S250.

Here, the generated final image may be output through a display screen (for example, a head-up display, a cluster, a navigation screen, or the like) provided in the vehicle.

Figure 3:
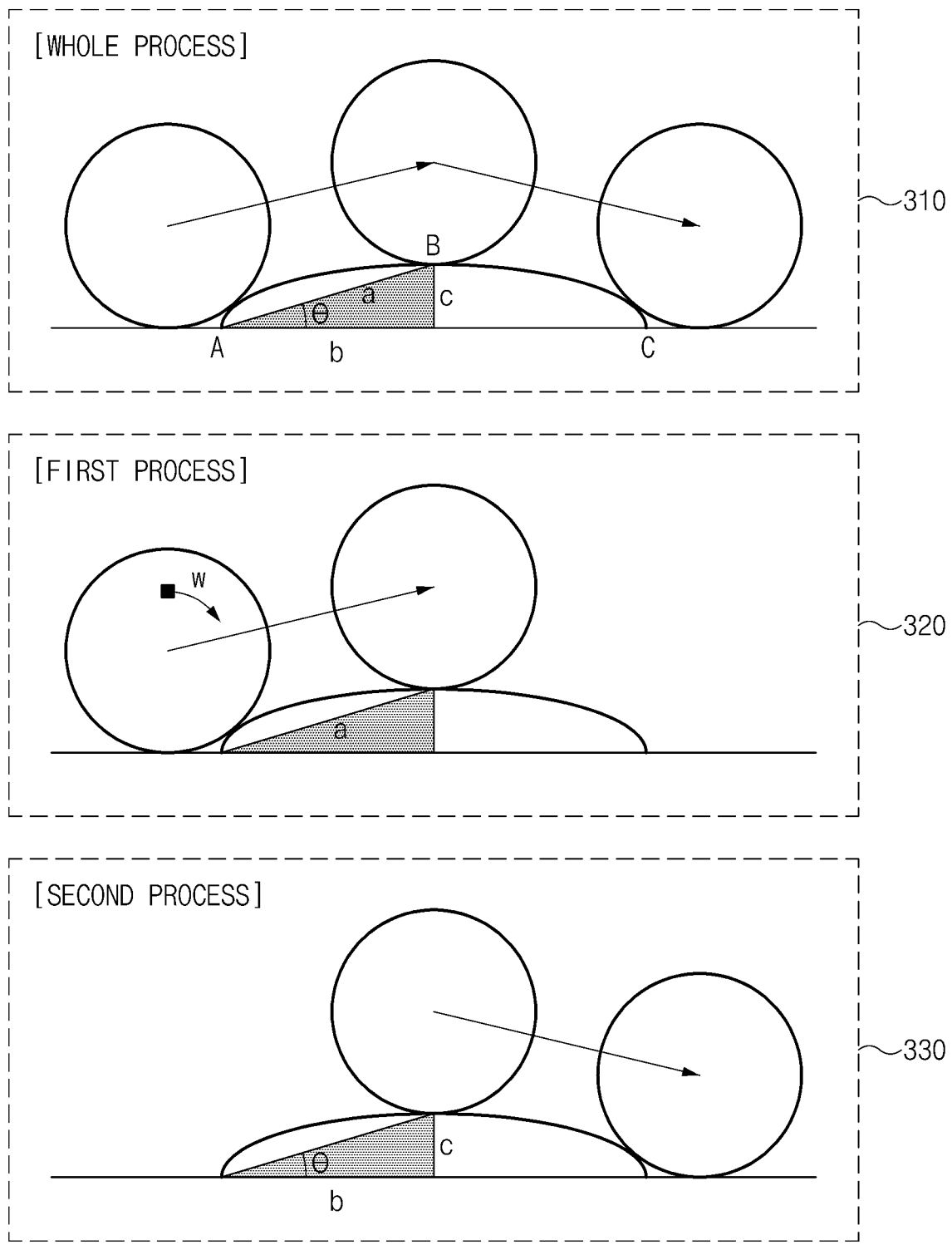
FIG. 3 is a diagram for describing a method for measuring a characteristic value corresponding to a corresponding speed bump in the case of passing through the speed bump according to an embodiment of the present disclosure.

FIG. 3 is a diagram for describing a method for measuring a characteristic value corresponding to a corresponding speed bump in the case of passing through the speed bump according to an embodiment of the present disclosure;

As shown in reference numeral 310, values to be measured or calculated using sensing data to figure out characteristics of an obstacle may include a height (c) of the obstacle, a width of the obstacle (2*b), and an incident angle (θ).

Points A, B, and C in reference numeral 310 may be obtained based on sensing data of an acceleration sensor, that is, vertical vibration data.

Reference symbol "a" in reference numeral 310 may be calculated by integrating a wheel speed in section A-B through a wheel speed sensor.

Reference symbol "b" in reference numeral 310 may be calculated by dividing a value, obtained by integrating a vehicle speed in the section A-C, by 2.

The reference symbol θ (incident angle) in the reference numeral 310 may be calculated as cos−1 (b/a).

The reference symbol "c" in reference numeral 310 may be calculated as a*sin θ.

Hereinafter, a process for calculating a time and a distance required to pass through an obstacle will be described.

In a first process, referring to reference numerals 310 and 320, the time and distance required to reach from the starting point A of the obstacle to the highest point B of the obstacle may be calculated as follows.

Here, the time may be calculated to be a travel time between a point where a change starts rapidly in the vertical positive direction (Z+) and a point where a change starts in the vertical negative direction (Z−), when being measured by an acceleration sensor, and the distance "a" may be calculated by integrating a speed measured through the wheel speed sensor in section A-B.

In a second process, referring to reference numerals 310 and 330, the time and distance required to reach from the highest point "B" of the obstacle to the end point C of the obstacle may be calculated as follows.

Here, the time may be calculated to be a travel time between a point where a change starts in the vertical negative direction (Z−) and a point where a change rapidly decreases in the vertical direction and a distance "b" may be calculated by calculating a width of the obstacle by integrating a speed of the vehicle in section A-C and dividing the calculated width of the obstacle by 2.

When the distances "a" and "b" are calculated through the above processes 1 and 2, the incident angle θ may be calculated by $\cos^{-1}$ (b/a), and the height c of the obstacle may be calculated by a*sin θ.

Figure 4:
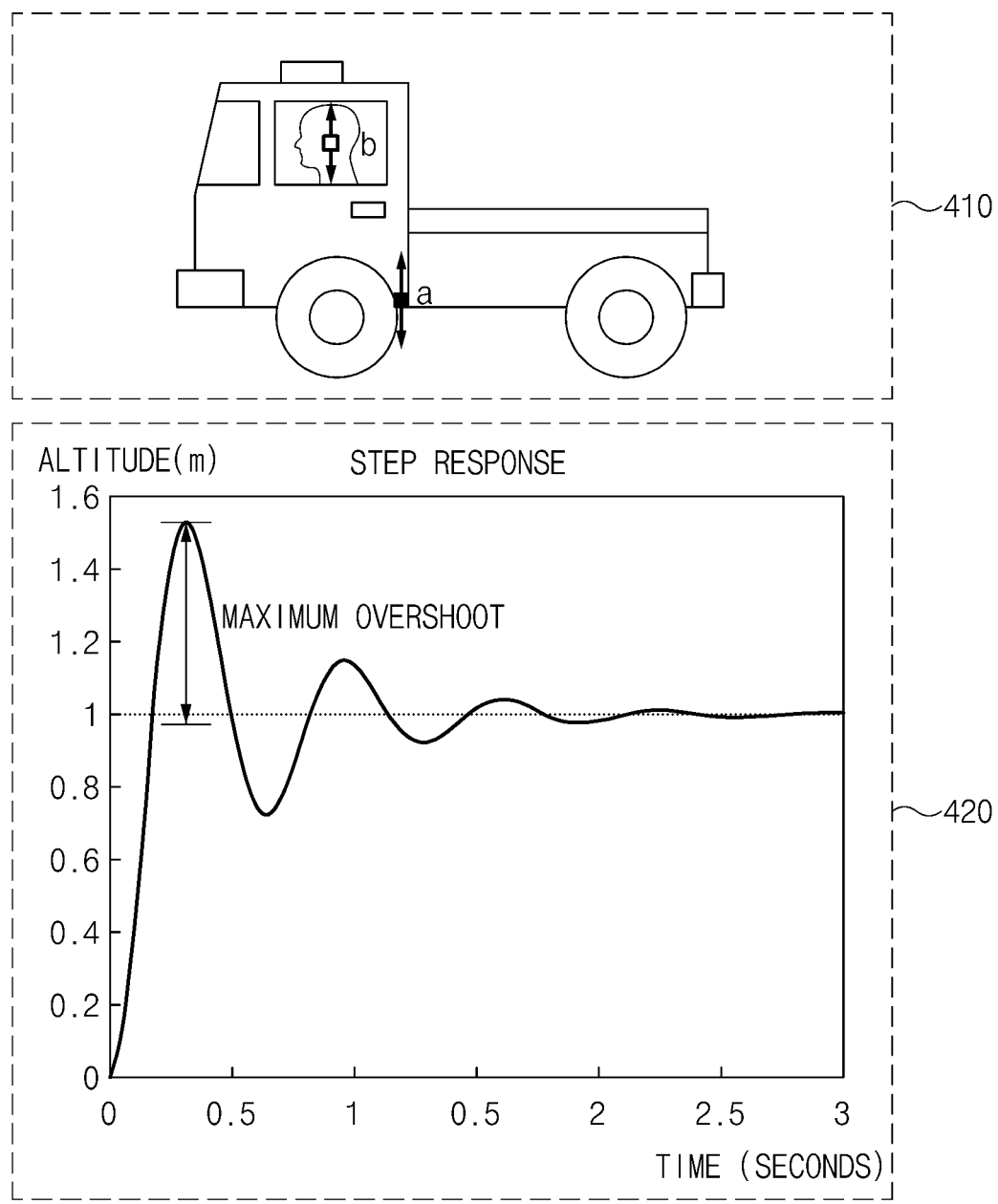
FIG. 4 is a diagram for describing a correlation between vibration of a vehicle body and vibration of a human body.

FIG. 4 is a diagram for describing a correlation between vibration of a vehicle body and vibration of a human body.

Referring to reference numeral 410 of FIG. 4, reference symbol "a" indicates an acceleration sensor attached to a vehicle body, and reference numeral "b" indicates an acceleration sensor attached to the head of a human body. In this case, a model used may be a mathematical model of the human body in which vibration characteristics of the human body for vertical vibrations are obtained through test results and verification of the human body's vertical vibrations, as a standard human body vertical vibration model of ISO5982.

Therefore, it may be said that the vibration characteristics measured by the acceleration sensor "a" is directly related to the riding comfort.

A graph shown in reference numeral 420 represents under-damping vibration characteristics in a mechanical system.

A differential equation and a transfer function for the under-damping vibration: characteristics of the mechanical system are as follows.

$$m\ddot{y} + b\dot{y} + cy = d \text{ or } \ddot{y} + 2\zeta\omega_n\dot{y} + \omega_n^2 x = k_a\omega_n^2 u \quad <\text{differential equation}>$$

$$G(s) = \frac{1}{ms^2 + cs + k} = \frac{k_a\omega_n^2}{s^2 + 2\zeta\omega_n s + \omega_n^2} \quad <\text{Transfer function}>$$

Where an inertia force (I)=ÿ, a damping force (D)=bẏ, an elastic recovery force (K)=cy, excitation force (F)=d, $$\zeta(\text{Damping Ratio}) = \frac{c}{2\sqrt{m/a}}, \text{ and } \omega_n(\text{National Frequency}) = \sqrt{\frac{k}{m}}.$$

When "c" (spring's elastic modulus) and "d" (obstacle specification) are fixed, it is possible to minimize vibrations of the vehicle body and vibrations transferred to the human body to improve the riding comfort by finding out and controlling "b" (damping ratio) that minimizes "m" (inertial mass of the vehicle) to reduce the size of the maximum overshoot.

FIG. 5 is a diagram for describing data included in a road surface classification model according to an embodiment of the present disclosure.

Referring to FIG. 5, a road surface classification model may include a type of a road surface and a type of obstacles which are obtained through image analysis for an image photographed by a camera for each location information obtained by using a GPS signal, and an obstacle characteristic value, a damping characteristic value, and an inertial mass characteristic value which are obtained and calculated using a physical sensor.

The obstacle characteristic value may include the height and depth (cm) of a relevant obstacle, the width (cm) of the obstacle, the incident angle (°) of a vehicle wheel when entering an obstacle, obstacle specification (d), or the like.

The damping characteristic value may include a piston speed (m/s) or a damping ratio (b).

The inertial mass characteristic value may include a vertical acceleration (m/s$^2$), an inertial mass (m), and a riding comfort (1-10). In this case, the riding comfort may increase as a value thereof increases, The road surface classification model may be recorded and maintained on a storage medium provided in the ECS control apparatus 50, but is merely an example embodiment. In another embodiment, the information on the road surface classification model may be stored in a server (not shown) connected to an external communication network of the vehicle, and the server may provide information on the road surface classification model in real time at a request of the vehicle while driving.

Figure 6:
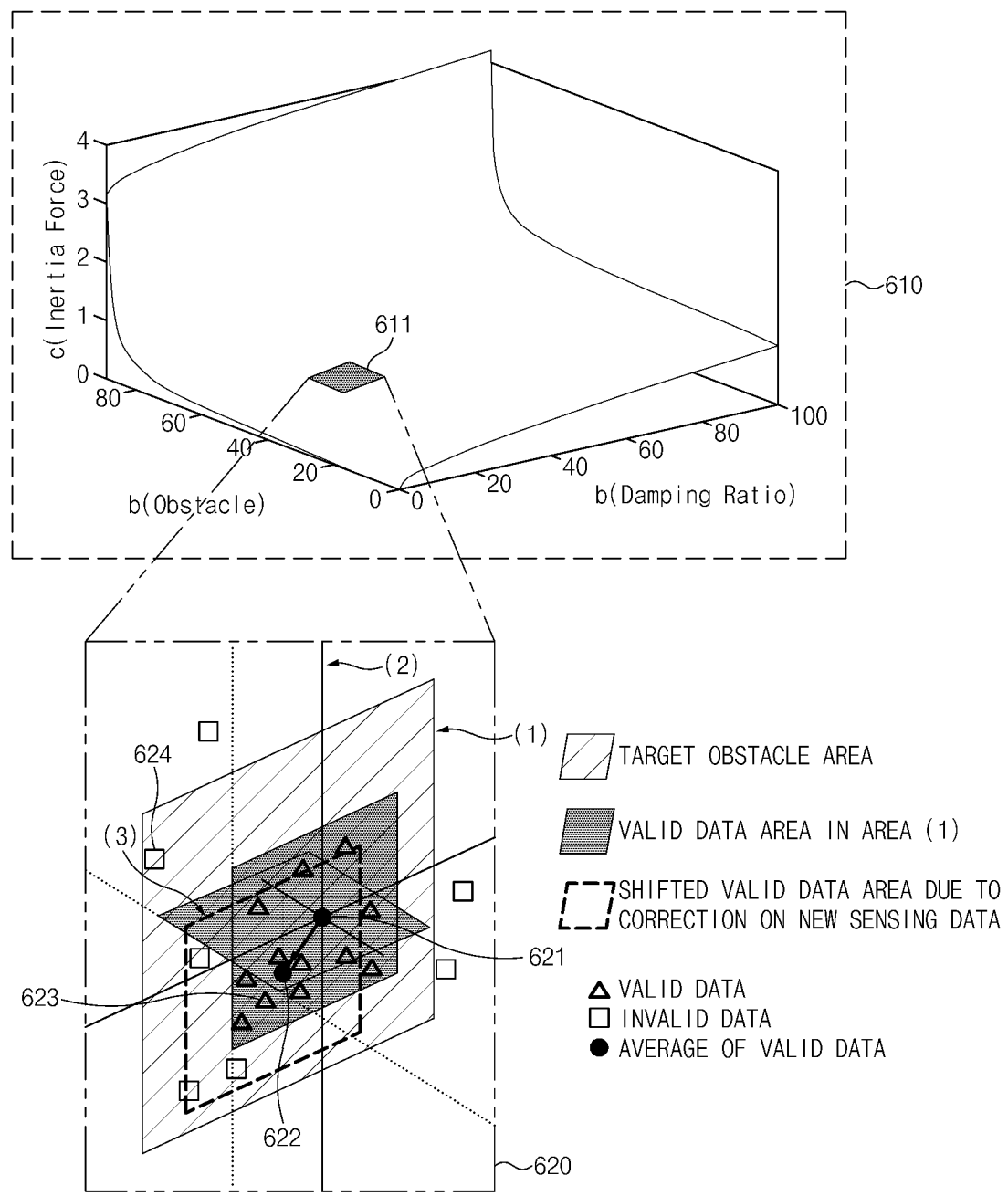
FIG. 6 is a diagram for describing a method for correcting characteristic values for a road surface classification model based on sensing data collected in real time according to an embodiment of the present disclosure.

FIG. 6 is a diagram for describing a method for correcting characteristic values for a road surface classification model based on sensing data collected in real time according to an embodiment of the present disclosure.

Referring to reference numeral 610, the x-axis of a graph represents the damping ratio (b), the y-axis represents the obstacle specification (d), and the z-axis represents the inertial mass (c) of the vehicle. It may be said that the riding comfort increases as a magnitude of the inertial mass (c) decreases.

Reference numeral 620 is an enlarged drawing of reference numeral 611.

Reference numeral 621 (point 1) may be determined to be an average value of pieces of valid data in a target obstacle area (corresponding to reference symbol (1)), that is, an arithmetic average of the damping ratio (b) at a relevant obstacle characteristic value (d) and the inertial mass (c) of the vehicle.

Reference numeral 623 (point 2) is valid data used for calculation of point 1 621.

Reference numeral 624 (point 3) is actually-measured data, but is invalid data that is not used to calculate point 1 621.

An area indicated by reference symbol (1) may be a plane corresponding to an obstacle characteristic value d (Obstacle) having a specific constant value.

An area indicated by reference symbol (2) may be a plane corresponding to a valid data range in area (1).

An area indicated by reference symbol (3) may be a plane corresponding to the valid data range shifted due to the new sensing data.

When assuming that the damping ratio (b) and the inertial mass (c) data for an obstacle specification (d=constant) of a specific constant, the average thereof may be $$x_m = \frac{\sum x_i}{l}.$$

In this case, the average of all measured is calculated, data with low reliability may be included. Therefore, it is necessary to select valid data as input values. To this end, the average may be calculated by setting a certain range (area (1)) around the current average value.

Subsequently, when passing through an obstacle with the same obstacle specification and calculation may be performed by including the collected sensing data in input data for calculation of an average. Therefore, when $x_m$ is changed, the valid data area may be changed from area (2), which had been the valid data range, into area (3) centered on $x_m$ that is, the reference numeral 622.

Figure 7:
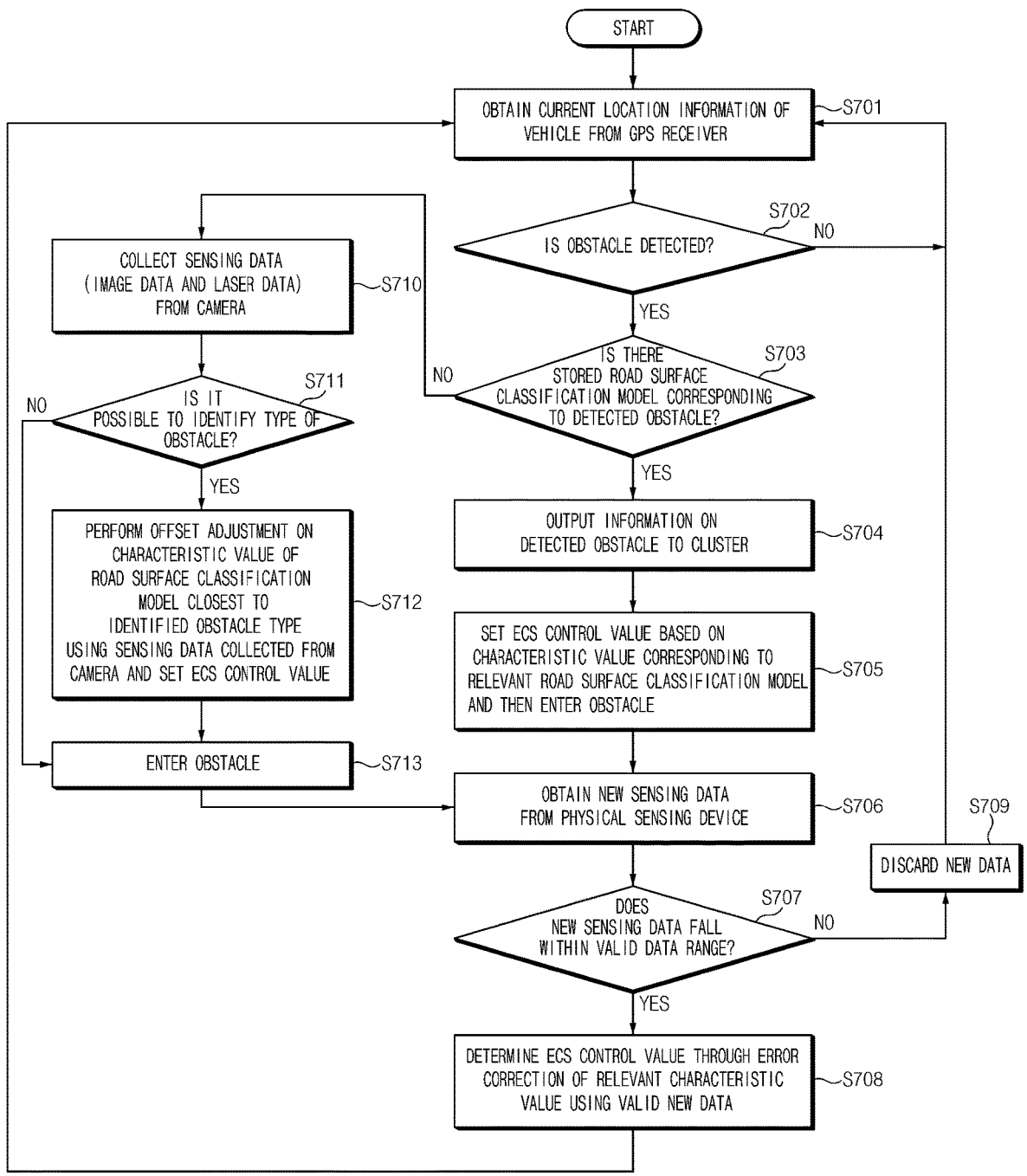
FIG. 7 is a flowchart for describing a method for controlling an electronic control suspension according to an embodiment of the present disclosure.

FIG. 7 is a flowchart for describing a method for controlling an electronic control suspension according to an embodiment of the present disclosure.

Referring to FIG. 7, when a vehicle starts driving, the ECS control apparatus 50 may obtain current location information of the vehicle, for example, latitude and longitude, from the GSP receiver 10 at S701.

The ECS control apparatus 50 may detect a front obstacle while driving at S702. For example, the ECS control apparatus 50 may detect whether an obstacle exist using means such as a radar, a lidar, a camera, or the like.

The ECS control apparatus 50 may identify whether there is a road surface classification model stored corresponding to the detected obstacle at S703.

When a road surface classification model stored corresponding to the detected obstacle exists as a result of identification, the ECS control apparatus 50 may output information on the detected obstacle to the cluster 70 at S704. Here, the output information may include information on a type of the obstacle, information on a road surface condition around the obstacle or the like, but is not limited thereto.

The ECS control apparatus 50 may determine and set an ECS control value based on a characteristic value corresponding to the corresponding road surface classification model and then enter the obstacle at S705.

The ECS control apparatus 50 may obtain new sensing data from the physical sensing device 40 while passing through the obstacle at S706.

The ECS control apparatus 50 may determine whether the new sensing data falls within a valid data range at S707.

As a result of the determination, when the new sensing data is in a valid data range, the ECS control apparatus 50 may perform error correction on an existing characteristic value of the corresponding road surface classification model using new valid data and determine the ECS control value based on the error-corrected characteristic value at S708.

As a result of the determination in S707, when the new sensing data is outside the valid data range, the ECS control apparatus 50 may discard the new sensing data at S709 and then perform S701.

When there is no previously stored road surface classification model corresponding to the obstacle detected in S703, the ECS control apparatus 50 may collect sensing data from the camera device 20 at S710. In this case, the sensing data may include at least one of image data and laser data.

The ECS control apparatus 50 may determine whether it is possible to identify a type of the obstacle type based on sensing data collected from the camera device 20 at S711.

As a result of the determination, when it is possible to identify the type of the obstacle, the ECS control apparatus 50 may perform offset adjustment on the characteristic value of the road surface classification model closest to the identified type of the obstacle using the sensing data collected from the camera device 20, set the ECS control value according to the offset-adjusted characteristic value, and enter the obstacle at S712 and S713. In this case, the ECS control apparatus 50 may perform S706 described above when passing through the obstacle.

When the new sensing data is obtained from the physical sensing device after entering the obstacle through the above S710 to S712, the ECS control apparatus 50 according to an embodiment may generate a road surface classification model corresponding to the obstacle identified based on the obtained new sensing data and store the road surface classification model in an internal storage medium.

As an embodiment, the physical sensing device 40 may include a vehicle speed sensor, a wheel speed sensor, an acceleration sensor, a throttle position sensor of a damper, and the like.

The new sensing data collected from the physical sensing device 40 may include vehicle speed data, wheel speed data, piston acceleration data of a damper, throttle position data of the damper, and the like and the ECS control apparatus 50 may calculate the height/depth, width, and incident angle of the obstacle based on the new sensing data collected from the physical sensing device 40, find out a damping characteristic value that minimizes the inertial mass of a vehicle body, and control the damper.

Figure 8:
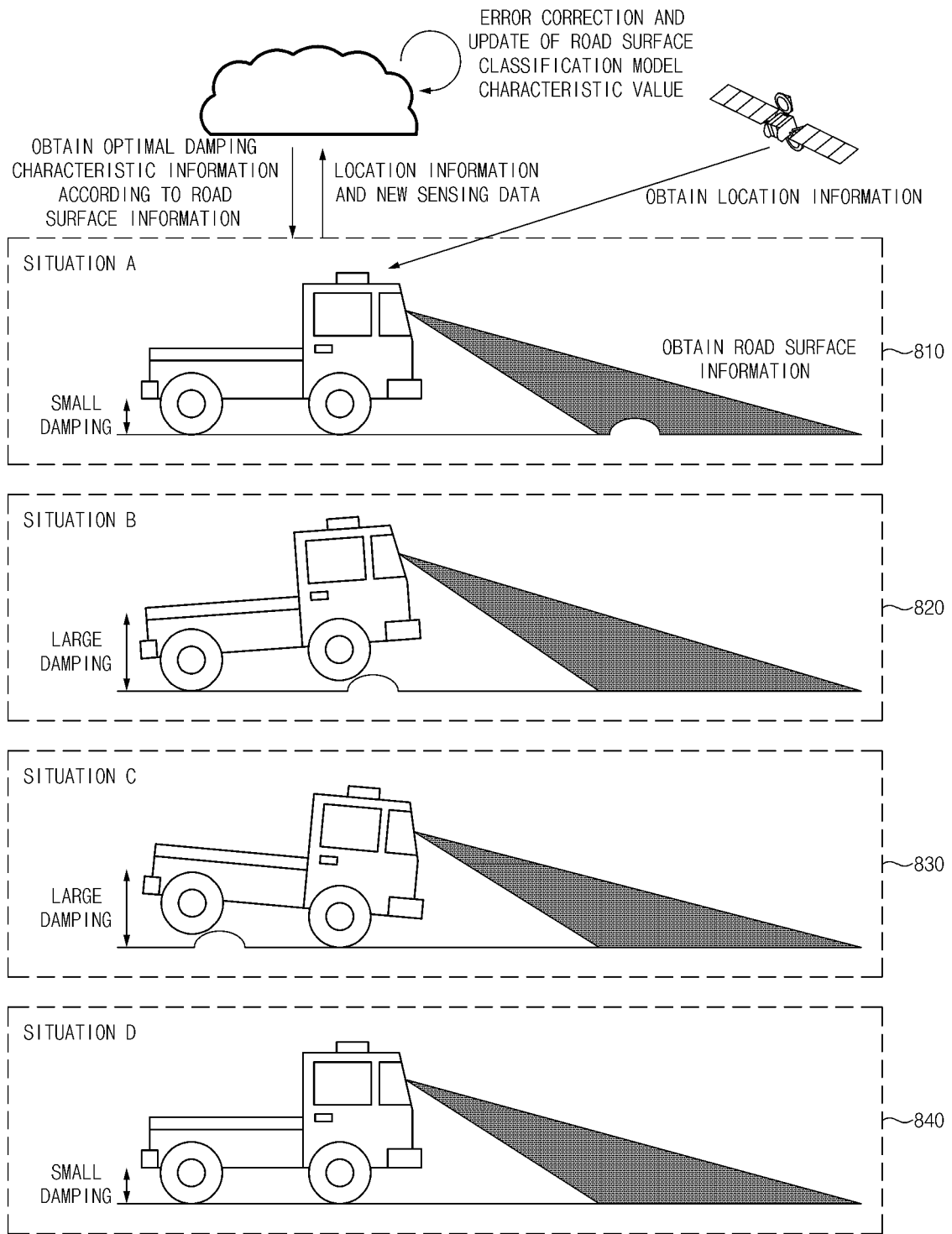
FIG. 8 is a diagram for describing a method for updating a road surface classification model through deep learning and an ECS control procedure when a vehicle passes through an obstacle according to an embodiment of the present disclosure.

FIG. 8 is a diagram for describing a method for updating a road surface classification model through deep learning and an ECS control procedure when a vehicle passes through an obstacle according to an embodiment of the present disclosure.

Referring to FIG. 8, situation A shown at 810 represents a situation in which a vehicle travels on a general road surface and has a small damping characteristic. Here, the vehicle may obtain current location information of the vehicle using a GPS receiver, obtain road surface information (information on obstacle type and road surface condition and the like) through a camera and an IR laser, and drive using an ECS control value suitable for the road surface information. When the vehicle identifies a road surface classification model on a driving route with reference to a database maintained on an internal or external server during driving and recognizes appearance of an obstacle in front of a road to be driven, the vehicle may obtain optimal damping characteristic information immediately before entering the obstacle, determine a control value and control an ECS damping force with the determined control value, thus improving the riding comfort.

Situation B shown at 820 and situation C shown at 830 represent situations in which the vehicle passes through an obstacle using damping characteristics derived from situation A 810. In this case, the vehicle may collect new sensing data through built-in physical sensors while passing through the obstacle, and calculate the height, width, and incident angle of the obstacle, a damping characteristic, an inertial mass based on the collected new sensing data. The vehicle may compare the calculated characteristic value with an existing characteristic value and perform correction related to learning.

Situation D shown at 840 represents a situation in which a vehicle drives at a constant speed on a smooth road surface after completely passing through the obstacle.

The operations of the method or the algorithm described in connection with the embodiments disclosed herein may be embodied directly in hardware or a software module executed by the processor, or in a combination thereof. The software module may reside on a storage medium (that is, the memory and/or the storage) such as a RAM, a flash memory, a ROM, an EPROM, an EEPROM, a register, a hard disk, a removable disk, and a CD-ROM.

The exemplary storage medium may be coupled to the processor, and the processor may read information out of the storage medium and may record information in the storage medium. Alternatively, the storage medium may be integrated with the processor. The processor and the storage medium may reside in an application specific integrated circuit (ASIC). The ASIC may reside within a user terminal. In another case, the processor and the storage medium may reside in the user terminal as separate components.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

According to the present disclosure, it is possible to provide a method and an apparatus for controlling an electronic control suspension using a deep learning-based road surface classification model.

According to the present disclosure, it is possible to provide a method and an apparatus for controlling an electronic control suspension which provides an optimal control value for the electronic control suspension by correcting a control value in real time through deep learning based on actually-measured data of detected obstacles.

According to the present disclosure, it is possible to identify not only a type and a position of an obstacle but also a detailed specification of the obstacle through a deep learning-based road surface classification model and correct a road surface classification model based on actually-measured data for the obstacle to provide optimal control for the electronic control suspension, thus improving riding comfort.

In addition, various effects may be provided that are directly or indirectly understood through the disclosure.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

The invention claimed is:

1. A method for controlling an electronic control suspension in a vehicle including a camera and a GPS receiver, the method comprising:
collecting location information of the vehicle using the GPS receiver while driving;
identifying whether there is a previously generated road surface classification model corresponding to a front obstacle when the front obstacle is detected;
determining a first control value based on a first characteristic value corresponding to the previously generated road surface classification model when a road surface classification model is identified;
controlling the electronic control suspension with the first control value when entering the front obstacle, and collecting new sensing data through a physical sensor; and
correcting the first characteristic value based on the new sensing data;
wherein the first characteristic value includes an obstacle characteristic value, a damping characteristic value, and an inertial mass characteristic value,
wherein the obstacle characteristic value includes height or depth information of the front obstacle, width information of the front obstacle, incident angle information that is an angle of entry to the front obstacle, and obstacle specification information;
wherein the damping characteristic value includes piston speed information and damping ratio information; and
wherein the inertial mass characteristic value includes vertical acceleration information, inertial mass information, and riding comfort information.

2. The method of claim 1, further comprising:
performing image processing using the camera when there is no previously generated road surface classification model corresponding to the detected front obstacle.

3. The method of claim 2, wherein the performing of the image processing using the camera includes:
collecting image data from the camera; and
identifying a type of the front obstacle by applying a convolutional neural network algorithm to the image data.

4. The method of claim 3, wherein the performing of the image processing using the camera includes:
collecting radar data from the camera; and
calculating a distance from the vehicle to the detected front obstacle using the radar data.

5. The method of claim 4, further comprising:
outputting information on the type of the front obstacle to a cluster of the vehicle.

6. The method of claim 1, wherein the physical sensor includes at least one of a vehicle speed sensor, a wheel speed sensor, an acceleration/displacement sensor, and a throttle position sensor.

7. The method of claim 1, wherein the correcting of the first characteristic value includes:
determining whether the new sensing data falls within a valid data range;
generating a second characteristic value by calculating an average of the new sensing data in the valid data range; and
correcting an error by comparing the second characteristic value with the first characteristic value.

8. The method of claim 7, wherein the valid data range is adjusted according to the error correction.

9. An apparatus for controlling an electronic control suspension in cooperation with a camera device, a GPS receiver, and a physical sensing device provided in a vehicle, the apparatus comprising:
a location information collection module configured to collect location information of the vehicle from the GPS receiver while driving;
a control module configured to identify whether a previously generated road surface classification model corresponding to a front obstacle exists, and to control a damping force of the electronic control suspension when a front obstacle is detected;
a control value determination module configured to determine a first control value corresponding to the damping force based on a first characteristic value corresponding to the road surface classification model;

a physical sensing module configured to collect new sensing data from the physical sensing device while passing through the detected front obstacle when the damping force is set to the determined first control value; and a characteristic value generation module configured to correct the first characteristic value based on the new sensing data;

wherein the first characteristic value includes an obstacle characteristic value, a damping characteristic value, and an inertial mass characteristic value, wherein the obstacle characteristic value includes height or depth information of the front obstacle, width information of the front obstacle, incident angle information that is an angle of entry to the front obstacle, and obstacle specification information;

wherein the damping characteristic value includes piston speed information and damping ratio information; and wherein the inertial mass characteristic value includes vertical acceleration information, inertial mass information, and riding comfort information.

10. The apparatus of claim 9, further comprising:

an image processing module configured to perform image processing in cooperation with the camera device according to a control signal of the control module when there is no previously generated road surface classification model corresponding to the detected front obstacle identified.

11. The apparatus of claim 10, wherein the image processing module is configured to:

collect image data from the camera device; and identify a type of the front obstacle by applying a convolutional neural network algorithm to the image data.

12. The apparatus of claim 11, wherein the image processing module is configured to includes:

collect radar data from the camera device; and calculate a distance from the vehicle to the detected front obstacle using the radar data.

13. The apparatus of claim 11, wherein the image processing module is configured to output information on the identified type of the front obstacle to a cluster of the vehicle.

14. The apparatus of claim 9, wherein the physical sensing device includes at least one of a vehicle speed sensor, a wheel speed sensor, an acceleration/displacement sensor, and a throttle position sensor.

15. The apparatus of claim 9, wherein the characteristic value generation module is configured to:

determine whether the new sensing data falls within a valid data range;

generate a second characteristic value by calculating an average of the new sensing data in the valid data range; and correct an error by comparing the second characteristic value with the first characteristic value.

16. The apparatus of claim 15, wherein the valid data range is adjusted according to the error correction.

* * * * *